United States Patent
Wang et al.

(10) Patent No.: US 10,956,702 B2
(45) Date of Patent: Mar. 23, 2021

(54) APPARATUS FOR RECOGNIZING A FINGERPRINT, AND DISPLAY DEVICE

(71) Applicant: BOE Technology Group Co., Ltd., Beijing (CN)

(72) Inventors: Lei Wang, Beijing (CN); Haisheng Wang, Beijing (CN); Yingming Liu, Beijing (CN); Xiaoliang Ding, Beijing (CN); Changfeng Li, Beijing (CN); Xiaoquan Hai, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/424,561

(22) Filed: May 29, 2019

(65) Prior Publication Data

US 2020/0082146 A1    Mar. 12, 2020

(30) Foreign Application Priority Data

Sep. 12, 2018  (CN) .............................. 201811063599

(51) Int. Cl.
  *G06K 9/00* (2006.01)
  *G02B 3/04* (2006.01)
  (Continued)

(52) U.S. Cl.
  CPC .......... *G06K 9/00013* (2013.01); *G02B 3/04* (2013.01); *G02B 3/06* (2013.01); *G02B 5/208* (2013.01)

(58) Field of Classification Search
  None
  See application file for complete search history.

(56) References Cited

U.S. PATENT DOCUMENTS

2008/0316323 A1* 12/2008 Morita ................. G06K 9/0004
                                                          348/222.1
2017/0270339 A1    9/2017 Zou
(Continued)

FOREIGN PATENT DOCUMENTS

CN        202230492 U    5/2012
CN        103699884 A    4/2014
(Continued)

OTHER PUBLICATIONS

Chinese Office Action for corresponding application 201811063599.8 dated Apr. 17, 2020.

*Primary Examiner* — Joseph R Haley
(74) *Attorney, Agent, or Firm* — Arent Fox LLP; Michael Fainberg

(57) ABSTRACT

Disclosed are an apparatus for recognizing a fingerprint, a display device, and the apparatus includes: a display panel, light sources, a supporting element, an optically-coupling element, a photo-detecting element on optical paths of the light sources, a processing element; the light sources, the supporting element are on side of a second surface of the display panel; the supporting element supports light sources so that light rays exiting light sources are incident obliquely onto the display panel; the optically-coupling element, the photo-detecting element are on the second surface; the photo-detecting element is on side of the optically-coupling element away from light sources; the optically-coupling element makes light rays emitted from light sources totally reflect in the display panel; the photo-detecting element detects exiting light after light rays exiting the light sources are reflected by the display panel, transmits detected signals to the processing element; the processing element determines a fingerprint pattern.

16 Claims, 3 Drawing Sheets

(51) Int. Cl.
*G02B 3/06* (2006.01)
*G02B 5/20* (2006.01)

(56) References Cited

U.S. PATENT DOCUMENTS

2019/0138154 A1\* 5/2019 Smith ..................... B32B 17/06
2019/0311172 A1\* 10/2019 Kang ................... G06K 9/0002

FOREIGN PATENT DOCUMENTS

| | | |
|---|---|---|
| CN | 105759330 A | 7/2016 |
| CN | 105844233 A | 8/2016 |
| CN | 106022323 A | 10/2016 |
| CN | 107273808 A | 10/2017 |
| KR | 20170026125 A | 3/2017 |

\* cited by examiner

APPARATUS FOR RECOGNIZING A FINGERPRINT, AND DISPLAY DEVICE

CROSS-REFERENCE TO RELATED APPLICATION

This application claims priority of Chinese Patent Application No. 201811063599.8, filed on Sep. 12, 2018, which is hereby incorporated by reference in its entirety.

FIELD

The present disclosure relates to the field of fingerprint recognition, and particularly to an apparatus for recognizing a fingerprint, and a display device.

BACKGROUND

As the display technologies are advancing, electronic devices with a biological recognition function have stepped gradually into our life and working. Particularly, the fingerprint recognition technologies has been highly regarded as the most widely applied and the cheapest recognition technologies among the biological recognition technologies in more and more application fields due to their uniqueness and stability.

SUMMARY

In a first aspect, some embodiments of the disclosure provide an apparatus for recognizing a fingerprint, the apparatus including: a display panel having a preset transmittance, a plurality of light sources, a supporting element, an optically-coupling element, a photo-detecting element, and a processing element, the optically-coupling element and the photo-detecting element are on optical paths of the light sources wherein:

the display panel comprises: a first surface for displaying, and a second surface opposite to the first surface;

the light sources and the supporting elements are on one side of the second surface of the display panel, and the supporting element are configured to support the light sources so that light rays exiting from the light sources are incident obliquely onto the display panel;

the optically-coupling element and the photo-detecting element are on the second surface, and the photo-detecting element is on a side of the optically-coupling element away from the light sources;

the optically-coupling element is configured to make light rays emitted from the light sources totally reflect in the display panel;

the photo-detecting element is configured to detect exiting light after the light rays exiting from the light sources are reflected by the display panel, and to transmit detected signals to the processing element; and the processing element is configured to determine a pattern of fingerprint according to the detected signals.

In a possible implementation, in the apparatus above for recognizing a fingerprint according to some embodiments of the disclosure, the plurality of light sources are arranged in one dimension in a direction parallel to a surface of the display panel.

In a possible implementation, in the apparatus above for recognizing a fingerprint according to some embodiments of the disclosure, the apparatus further includes a plurality of flat convex cylindrical lenses corresponding to the plurality of light sources in a one-to-one manner; and the flat convex cylindrical lenses are on an optical path of their corresponding light sources, and axes of the flat convex cylindrical lenses are perpendicular to an arrangement direction of the plurality of light sources.

In a possible implementation, in the apparatus above for recognizing a fingerprint according to some embodiments of the disclosure, a convex surface of the flat convex cylindrical lenses is an aspheric surface.

In a possible implementation, in the apparatus above for recognizing a fingerprint according to some embodiments of the disclosure, the optically-coupling element is a right-angled prism, the right-angled prism has an inclined surface facing the light sources, and has a right-angled surface arranged on the second surface.

In a possible implementation, in the apparatus above for recognizing a fingerprint according to some embodiments of the disclosure, the apparatus further includes a light-absorbing layer; the light-absorbing layer is on a side of the photo-detecting element close to the optically-coupling element, and is on a surface of the photo-detecting element away from the display panel.

In a possible implementation, in the apparatus above for recognizing a fingerprint according to some embodiments of the disclosure, the light rays exiting from the light sources are infrared light.

In a possible implementation, in the apparatus above for recognizing a fingerprint according to some embodiments of the disclosure, the apparatus further includes a visible-light cutoff filter film located on a side of the photo-detecting element close to the display panel.

In a possible implementation, in the apparatus above for recognizing a fingerprint according to some embodiments of the disclosure, the supporting element has an inclined surface at an angle ranging from 40° to 50° from the second surface; and the light sources are fixed on the inclined surface, and face the display panel.

In a second aspect, some embodiments of the disclosure provide a display device including the apparatus above for recognizing a fingerprint.

In a possible implementation, in the display device above according to some embodiments of the disclosure, the display device includes a display panel for displaying an image; and the display panel for displaying an image is reused as the display panel in the apparatus for recognizing a fingerprint.

In a possible implementation, in the display device above according to some embodiments of the disclosure, the plurality of light sources in the apparatus for recognizing a fingerprint are arranged at an edge of the display panel.

DETAILED DESCRIPTION OF THE EMBODIMENTS

Figure 1A:
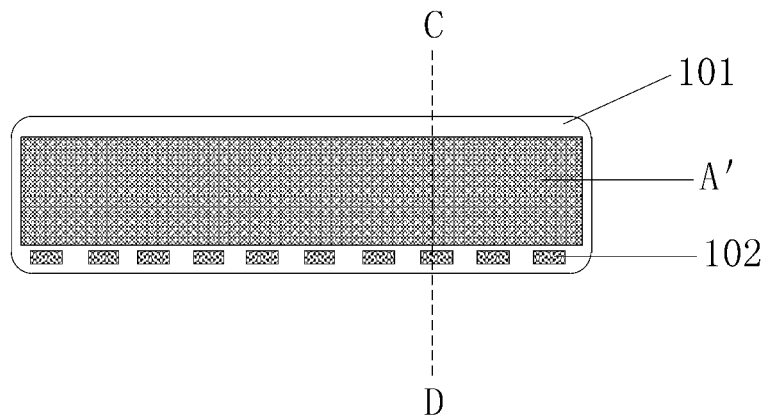
FIG. 1A is a schematic structural diagram of an apparatus for recognizing a fingerprint according to some embodiments of the disclosure in a top view.

In view of the problem in the related art that the existing apparatuses for recognizing a fingerprint optically are complicated in structure, and have low recognition precision, some embodiments of the disclosure provide an apparatus for recognizing a fingerprint, and a display device.

Particular implementations of the apparatus for recognizing a fingerprint, and the display device according to some embodiments of the disclosure will be described below in details with reference to the drawings. The thicknesses and shapes of respective layers in the drawings will not reflect any real proportion, but are only intended to illustrate the disclosure of the disclosure.

Figure 2:
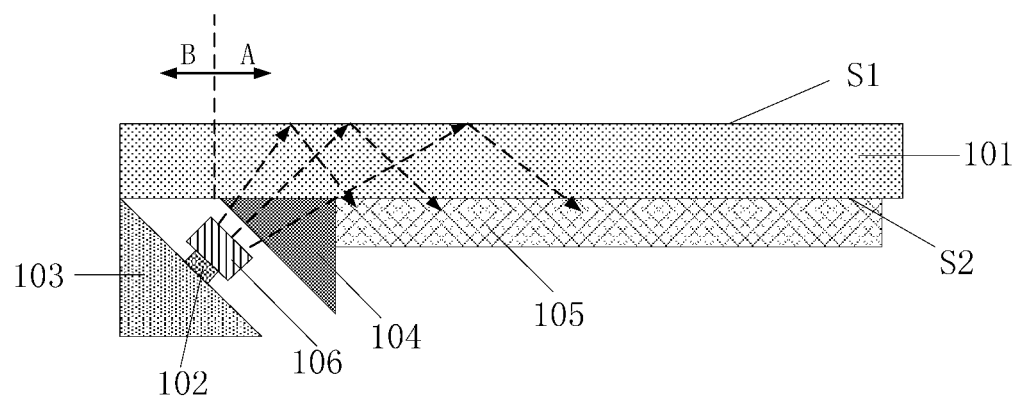
FIG. 2 is a schematic structural diagram of the apparatus for recognizing a fingerprint according to some embodiments of the disclosure in a sectional view.

In a first aspect, some embodiments of the disclosure provides an apparatus for recognizing a fingerprint as illustrated in FIG. 1A and FIG. 2, where FIG. 2 is a schematic diagram of FIG. 1A in a sectional view along an imaginary line CD, and the apparatus includes: a display panel 101, a plurality of light sources 102, a supporting element 103, optically-coupling elements 104 and a photo-detecting element 105 located on optical paths of the light sources 102, and a processing element.

As illustrated in FIG. 2, the display panel 101 includes: a first surface S1 for accepting a fingerprint, and a second surface S2 opposite to the first surface S1. Optionally, the transmittance of the display panel (e.g., OLED) is not less than 1%.

The light sources 102 and the supporting element 103 are located on one side of the second surface S2 of the display panel 101, and the supporting element is configured to support the respective light sources 102 so that light rays exiting the respective light sources 102 are incident obliquely onto the display panel 101. Optionally, the angle between the central light ray of each of the light sources 102 and the normal of the first surface S1 is 40-70°.

The optically-coupling element 104 and the photo-detecting element 105 are arranged on the second surface S2, and the photo-detecting element 105 is located on the sides of the optically-coupling element 104 away from the light sources 102.

The optically-coupling element 104 is configured to increase the angle at which the light rays emitted from the light sources 102 to the display panel 101 are incident.

The photo-detecting element 105 is configured to detect exiting light after the light rays exiting the respective light sources are reflected by the display panel 101, and to transmit detected signals to the processing element.

The processing element is configured to determine the touch position of a finger according to the detected signals, and to determine a pattern of finger valleys and ridges of the finger according to an intensity distribution of light rays at the determined touch position of the finger.

In the apparatus for recognizing a fingerprint according to some embodiments of the disclosure, the supporting elements are arranged to support the light sources so that the light rays exiting the respective light sources are incident onto the display panel, and the optically-coupling element increase the angle at which the light rays emitted from the light sources to the display panel are incident, so that it is easier for the light rays emitted from the light sources to the display panel to be totally reflected in the display panel; and the light rays are totally reflected to the photo-detecting element, and the processing element can determine the touch position of the finger, and the pattern of the fingerprint valleys and ridges of the finger according to the detected signals of the photo-detecting element to thereby recognize the fingerprint precisely. Furthermore the display device can be simplified in structure, and fabricated at a low cost.

Figure 1B:
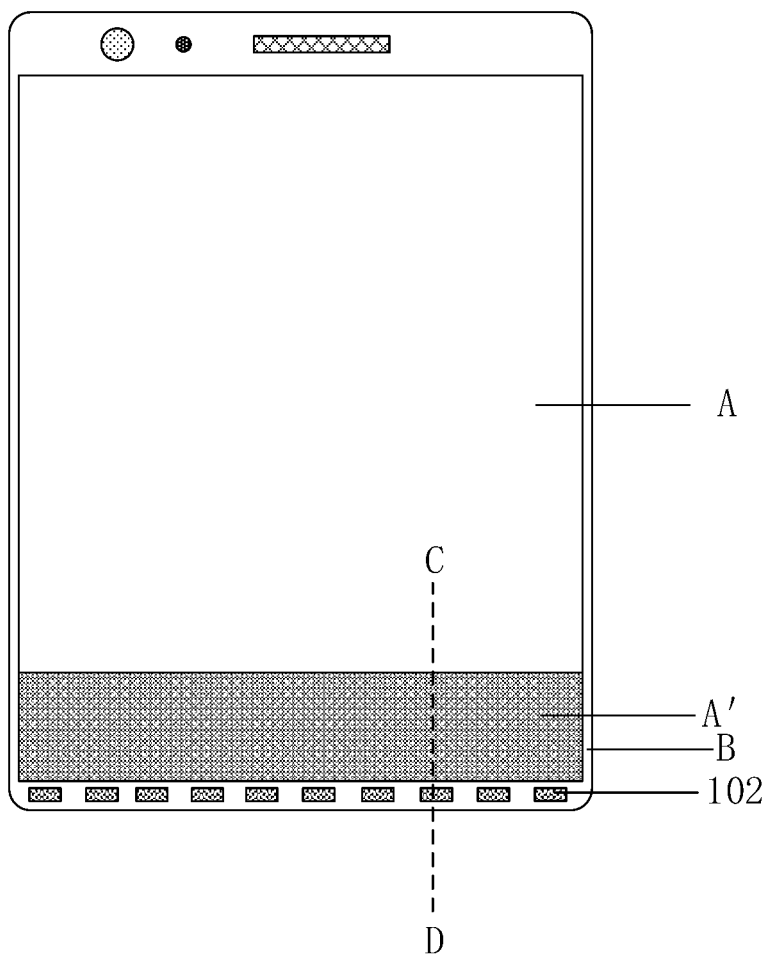
FIG. 1B is a schematic structural diagram of a display device according to some embodiments of the disclosure in a top view.

In some embodiments of the disclosure, as illustrated in FIG. 1B, the apparatus above for recognizing a fingerprint can be applied to a display device, which is preferably an Organic Light-Emitting Diode (OLED) display device, and in a particular implementation, a display panel in the display device can be reused as the display panel above.

Referring to FIG. 2, the supporting element 103 can have inclined surfaces at a preset angle from the second surface S2, so that the light rays exiting the light sources 101 can incident obliquely onto the display panel 101; and since the refractive index of the display panel 101 is greater than the refractive index of the air, the display panel 101 can be made of glass, for example, so when the light rays are transmitted to the interface between the display panel 101 and the air, if the reflection angle of the light rays are more than the critical angle of total reflection, the light rays will be totally reflected in the display panel 101 instead of exiting the display panel 101, so that an area covered with the light rays which can exiting the light sources is a fingerprint recognition area. As illustrated in FIG. 1A and FIG. 1B, for example, the plurality of light sources 102 are arranged at the lower edge of the display panel, so that a fingerprint recognition area A' is formed close to the lower edge to thereby perform a fingerprint recognition function. Such a part of the light rays exiting the light rays 102 that are totally reflected in the display panel can be transmitted to the photo-detecting element, and the remaining minority of the light rays can be refracted into the air. When the fingerprint of the finger is pressed at some position in the fingerprint recognition area A', there is no change to a light path of total reflection at the positions of the fingerprint valleys, and the light rays at the positions of the valleys can be totally reflected into the photo-detecting element 105, so there is a higher intensity of the light rays at the positions of the valleys, and the light rays at the positions of the fingerprint ridges cannot satisfy the total reflection condition because the light rays at the positions of the ridges are not transmitted from the display panel to the air, so that the majority of the light rays at the positions of the ridges are absorbed by the fingerprint ridges, and the minority of the light rays are transmitted into the photo-detecting element 105, so there is a lower intensity of the light rays at the positions of the ridges. The photo-detecting element 105 can detect the exiting lights after the light rays exiting the respective light sources are totally reflected by the display panel 101, and transmit the detected signals to the processing element; and the processing element can determine the touch position of the finger according to the detected signals, that is, the position where the intensity of the light is significantly changed is the touch position of the finger, the processing element can determine the pattern of the fingerprint valleys and ridges of the finger according to the intensity distribution of light rays at the touch position of the finger, where the positions at which there is a lower intensity of light rays are the positions of the ridges, and the positions at which there is a higher intensity of light rays are the positions of the valleys, and the processing unit can convert the different intensities of light rays into bright and dark strips according to the detected signals of the photo-detecting element 105, where the bright strips represent the positions of the valleys, and the dark strips represent the positions of the ridges, thus resulting in the pattern of the fingerprint of the finger, so that fingerprint information can be recognized according to the intensities of light rays.

The optically-coupling element 104 is configured to increase the angle at which the light rays emitted from the light sources 102 to the display panel 101 are incident, so that the light rays exiting the light sources 102 can be totally reflected in the display panel 101. Without the optically-coupling element 104, since the display panel 101 is generally a medium with a uniform thickness, and there is the air on both sides of the display panel 101, the light rays transmitted through the display panel 101 exits in the same direction as before they are incident into the display panel, due to the reversibility of their light paths, so the light rays which can be incident into the display panel 101 are sure to exit the display panel 101 from the other surface thereof. The light rays will be totally reflected in the display panel only if they are incident into display panel 101 at an greater more than or equal to 90°, so if the optically-coupling element 104 is not arranged, the light rays exiting the light sources will not be totally reflected in the display panel 101.

Optionally, in the apparatus above for recognizing a fingerprint according to some embodiments of the disclosure, as illustrated in FIG. 1A and FIG. 2, the plurality of light sources 102 are arranged in one dimension in a direction parallel to the surface of the display panel 101.

As illustrated in FIG. 1A, the plurality of light sources 102 are arranged in one dimension, and for example, the plurality of light sources 102 are arranged in a row at the lower edge of the display panel 101, and the light rays exiting the light sources 102 can cover the fingerprint recognition area A' positioned according to the distribution of the plurality of light sources 102, and sized according to a coverage area of the light rays exiting the plurality of light sources 102. The plurality of light sources 102 are arranged in one dimension and parallel to the surface of the display panel 101, so there is a uniform distance of the respective light sources 102 from the display panel 101, and thus there is a uniform intensity distribution of light in the fingerprint recognition area A' when there is no touch, thus improving the precision of fingerprint recognition.

Figure 3:
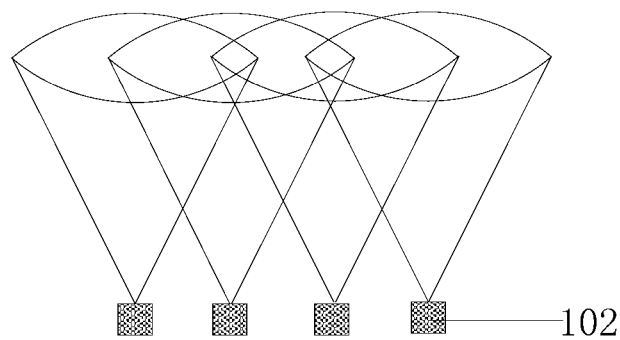
FIG. 3 is a schematic diagram of a crosstalk between light rays of light sources at a short distance from each other according to some embodiments of the disclosure.

In a particular implementation, the light sources above 102 are optionally Light Emitting Diodes (LEDs), and since the light-emitting diodes are generally point light sources, the light rays exiting the light sources 102 are transmitted in such a way that they emanate in a cone-shaped pattern as illustrated in FIG. 3. If the adjacent light sources 102 are at a too short distance from each other, the light rays exiting the adjacent light sources 102 will tend to cover each other after being transmitted over some distance, thus resulting in a crosstalk between the light rays, so that there will be a uniform intensity distribution of the light rays covering the fingerprint recognition area; and while the finger is touching the fingerprint recognition area, then it will be not easy for the photo-detecting element to determine whether the intensity distribution of light becomes non-uniform due to the touching finger or the crosstalk between the light rays, thus affecting the contrast of the resulting fingerprint pattern, and consequently degrading the precision of fingerprint recognition.

In view of this, in the apparatus above for recognizing a fingerprint according to some embodiments of the disclosure, as illustrated in FIG. 2, the apparatus can further include a plurality of flat convex cylindrical lenses 106 corresponding to the plurality of light sources 102 in a one-to-one manner.

Figure 4:
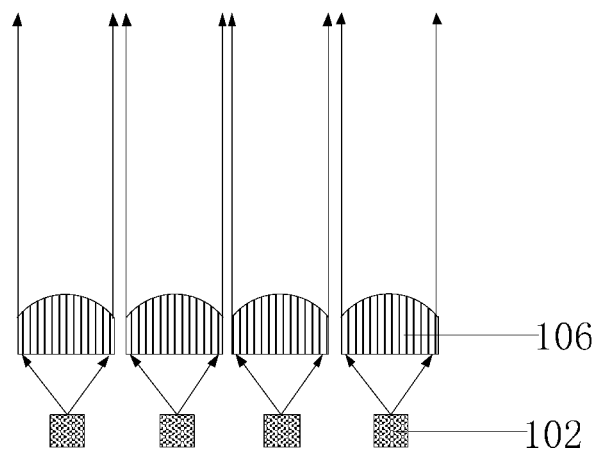
FIG. 4 is a first schematic diagram of a collimation effect of flat convex cylindrical lenses according to some embodiments of the disclosure.
Figure 5:
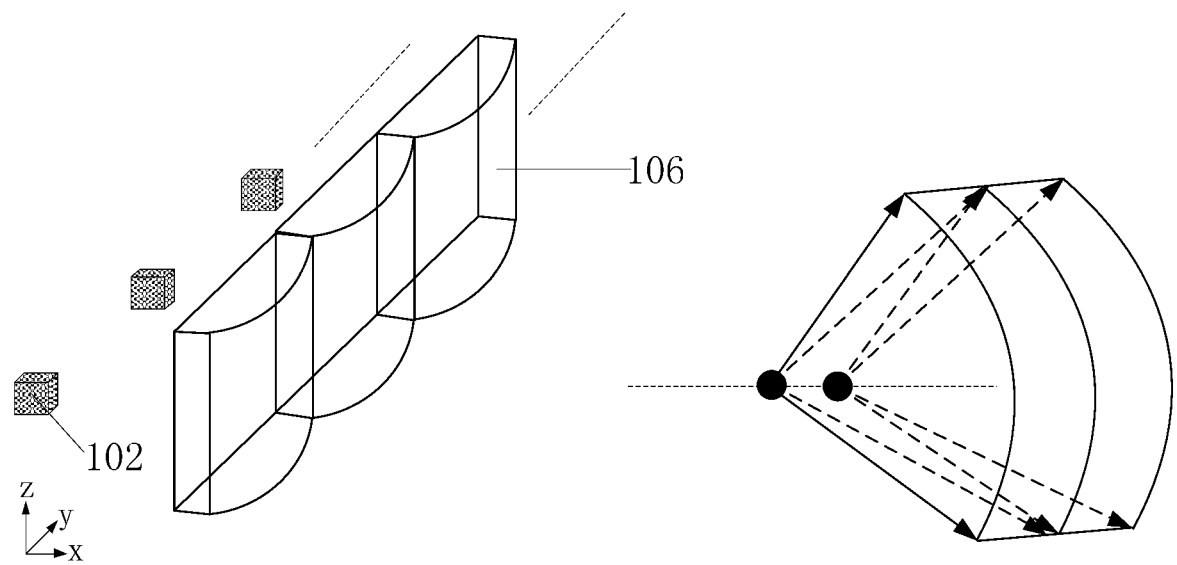
FIG. 5 is a second schematic diagram of a collimation effect of the flat convex cylindrical lenses according to some embodiments of the disclosure.

As illustrated in FIG. 4 and FIG. 5, the flat convex cylindrical lenses 106 are located on the optical paths of their corresponding light sources 102, and the axes of the flat convex cylindrical lenses 106 are perpendicular to the arrangement direction of the plurality of light sources 102.

As illustrated in FIG. 5, the flat convex cylindrical lenses 106 are configured to converge light rays in the direction of the one dimension without affecting any light rays in another direction; and optionally the axes of the flat convex cylindrical lenses 106 are perpendicular to the arrangement direction of the plurality of light sources 102, and the flat convex cylindrical lenses 106 have flat surfaces on which light is incident, and convex surfaces from which the light exits. Also referring to FIG. 4, the flat convex cylindrical lenses 106 can converge the light rays exiting their corresponding light sources 102, in the direction perpendicular to the axes of the flat convex cylindrical lenses 106, and in order for further understanding of the function of the flat convex cylindrical lenses 106, there are the plurality of light sources 102 arranged in one dimension, and the plurality of flat convex cylindrical lenses 106 corresponding to the light sources 102 in a one-to-one manner on the left side as illustrated in FIG. 5, where the flat convex cylindrical lenses 106 can converge the light rays in the xy direction, and the light rays can still emanate at some angle, and be transmitted in the z direction, so that the light rays exiting the light sources 102 are transmitted through the flat convex cylindrical lenses 106 as illustrated on the right side in FIG. 5. Accordingly, the flat convex cylindrical lenses 106 are arranged so that the light rays of the plurality of light sources 102 arranged in one dimension can have a wide coverage area, but also a crosstalk between the light rays exiting the adjacent light sources 102 can be avoided, so the adjacent light sources 102 can be at a shorter distance from each other, that is, the distribution density of the light sources 102 can be increased to thereby improve the precision of fingerprint recognition.

In a real application, in the apparatus above for recognizing a fingerprint according to some embodiments of the disclosure, the convex surfaces of the flat convex cylindrical lenses above are aspheric surface to thereby improve the collimation effect of the flat convex cylindrical lenses. Moreover in order to improve the collimation effect, the light sources can be embodied as mini-LEDs or micro-LEDs with a small size.

Optionally, in the apparatus above for recognizing a fingerprint according to some embodiments of the disclosure, as illustrated in FIG. 2, the optically-coupling element 104 is a right-angled prism with inclined surface facing the light sources, and right-angled surface is arranged on the second surface.

As illustrated in FIG. 2, since the inclined surface of the right-angled prism faces the light sources 102, the light rays emitted from the light sources 102 to the right-angled prism are refracted to the right-angled surface of the right-angled prism, and as illustrated, the light rays exiting the light sources 102 are emitted in the top-right direction, and the light rays are transmitted more rightward after passing the right-angled prism, thus increasing the angle at which the light rays emitted from the light sources 102 to the display panel 101 are incident. In some embodiments of the disclosure, the optically-coupling element 104 is a right-angled prism, for example, but other optically-coupling element may alternatively be possible in a particular implementation, and some embodiments of the disclosure will not be limited thereto.

Figure 6:
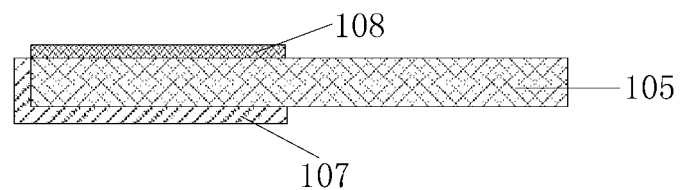
FIG. 6 is a first schematic diagram of a part of the apparatus for recognizing a fingerprint according to some embodiments of the disclosure.
Figure 7:
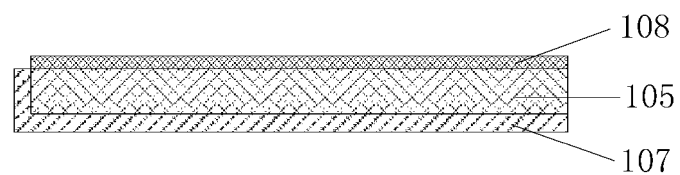
FIG. 7 is a second schematic diagram of a part of the apparatus for recognizing a fingerprint according to some embodiments of the disclosure.

Optionally, in the apparatus above for recognizing a fingerprint according to some embodiments of the disclosure, as illustrated in FIG. 2, FIG. 6, and FIG. 7, where FIG. 6 and FIG. 7 are schematic diagrams of a magnified part of the photo-detecting element as illustrated in FIG. 2, the photo-detecting element can further include a light-absorbing layer 107 located on the side of the photo-detecting element 105 close to the optically-coupling elements 104, and the surface thereof away from the display panel 101.

As illustrated in FIG. 2, light rays exiting the light sources 102 at a large angle may be transmitted directly to the photo-detecting element 105 through the optically-coupling element 104, that is, these light rays may not be incident into the display panel 101, but still incur a response of the photo-detecting element 105, thus resulting in a false positive, so optionally the light-absorbing layer 107 is arranged on the side of the photo-detecting element 105 close to the optically-coupling element 104, and the lower surface thereof, and here for the sake of a convenient description, the side of the photo-detecting element 105 away from the display panel 101 has been and will be referred to as the lower surface thereof. Optionally, the light-absorbing layer 107 can be made of the material of a Black Matrix (BM), light-extinction paint, or another material, for example, although the material of the light-absorbing layer 107 will not be limited thereto.

As illustrated in FIG. 7, since there are light rays only on the side of the photo-detecting element 105 close to the optically-coupling element 104, the light-absorbing layer 107 may be arranged on the lower surface of the photo-detecting element 105 only in a part of the area on the side thereof close to the optically-coupling element 104; or in order for convenient fabrication, the light-absorbing layer may alternatively be arranged throughout the lower surface of the photo-detecting element 105. In a particular implementation, the light-absorbing layer can be coated directly on the lower surface of the photo-detecting element 105.

In a particular application, in the apparatus above for recognizing a fingerprint according to some embodiments of the disclosure, the light rays exiting the light sources are infrared light. Since the infrared light is invisible light, even if the light rays exiting the light sources, which do not satisfy the total reflection condition exit the display panel from the first surface thereof, a display device to which the apparatus above for recognizing a fingerprint is applied will not be hindered from displaying an image normally.

Optionally, in order to avoid ambient visible light from hindering the photo-detecting element from detecting a fingerprint, as illustrated in FIG. 6 and FIG. 7, the apparatus above for recognizing a fingerprint according to some embodiments of the disclosure can further include a visible-light cutoff filter film 108 located on the side of the photo-detecting element 105 close to the display panel 101. As illustrated in FIG. 7, the visible-light cutoff filter film 108 can be arranged throughout a layer to thereby facilitate fabrication. Moreover when the area of the photo-detecting element 105 is larger than the fingerprint recognition area, the visible-light cutoff filter film 108 may alternatively be arranged only in correspondence to the fingerprint recognition area as illustrated in FIG. 6.

Moreover, since the majority of the light rays exiting the light sources 102 may be totally reflected in the display panel 101 instead of exiting the display panel 101 from the light exit face thereof, and only the minority of the light rays exiting at a small angle may exit the display panel 101, in a particular implementation, the light sources above 102 can alternatively be embodied as visible light source, and a light path can be controlled so that as there will be few light rays exiting at a small angle as possible so as to avoid the display effect of the display panel from being degraded.

In a particular implementation, in the apparatus above for recognizing a fingerprint according to some embodiments of the disclosure, as illustrated in FIG. 2, the supporting element 103 have inclined surfaces at an angle ranging from 40° to 50° from the second surface S2.

The respective light sources 102 are fixed on the inclined surfaces, and face the display panel 101.

As illustrated in FIG. 2, generally there is the highest intensity of light at the center of the light rays exiting the light sources 102, and there is a lower intensity of light at a larger angle from the central direction; and in order to make full use of the energy of the central light, the inclination of the inclined surfaces of the supporting element 103 can be adjusted so that the central light rays exiting the light sources 102 can satisfy the total reflection condition, and optionally the inclination angle of the supporting elements 103 is set to be substantially equal to the critical angle of total reflection. Optionally, the angle between the inclined surfaces of the supporting element 103 and the display panel 101 ranges from 40° to 50°, and is optionally 45°, so that full use can be made of the central light rays with a high intensity of light from the light sources to thereby form the fingerprint recognition area A' covered with the light rays with the high intensity.

In a second aspect, based upon the same inventive idea, some embodiments of the disclosure provide a display device including the apparatus above for recognizing a fingerprint, and the display device can be applicable to a mobile phone, a tablet computer, a TV set, a monitor, a notebook computer, a digital photo frame, a navigator, or any other product or component with a display function. Since the display device addresses the problem under a similar principle to the apparatus above for recognizing a fingerprint, reference can be made to the implementation of the apparatus above for recognizing a fingerprint for an implementation of the display device, and a repeated description thereof will be omitted here.

Furthermore, in the display device above according to some embodiments of the disclosure, the display device includes a display panel for displaying an image.

The display panel is reused as the display panel in the apparatus above for recognizing a fingerprint.

As illustrated in FIG. 1B, since the majority of the light rays exiting the light sources in the apparatus above for recognizing a fingerprint are totally reflected in the display panel, and only the minority of the light rays may exit the display panel from the first surface thereof, the apparatus above for recognizing a fingerprint can be significantly alleviated from affecting normal displaying on the display device. Alternatively a light path can be controlled so that the light rays exiting the light sources will not exit the display panel from the first surface thereof, or the light sources can be embodied as light sources emitting infrared light, thus normal displaying on the display device will not be affected. Accordingly the display panel is preferably reused as the display panel in the apparatus above for recognizing a fingerprint, and preferably the first surface of the display panel corresponds to a display face of the display panel. Moreover the fingerprint recognition area A' in the apparatus for recognizing a fingerprint can be arranged in a display area A of the display panel, that is, an image can be displayed normally but also a fingerprint can be recognized in the fingerprint recognition area A'.

In an optional embodiment of the disclosure, the display panel in the display device is reused as the display panel in the apparatus above for recognizing a fingerprint, and in a particular implementation, the apparatus above for recognizing a fingerprint can be used as a fingerprint recognition switch on the backside of a mobile phone, or another fingerprint recognition button, or the display panel in the apparatus for recognizing a fingerprint can be arranged separately in the display device, in some special scenario.

Still furthermore in the display device above according to some embodiments of the disclosure, as illustrated in FIG. 1B and FIG. 2, the plurality of light sources 102 are arranged at the edge of the display panel 101, so that the light sources 102 can be arranged in a bezel area B of the display panel 101, and the formed fingerprint recognition area A' can be formed in the display area A, so that the light sources 102 can be shielded by the bezel area B so as not to affect the display effect of the display device. FIG. 1B illustrates the plurality of light sources 102 arranged on the lower bezel of the display panel only by way of an example, but in a particular implementation, the plurality of light sources 102 can alternatively be arranged on another bezel. FIG. 1B illustrates the positions of the light sources 102 only by way of an example, but in a real application, the light sources 102 may be located below the bezel area B, so the pattern of the light sources 102 may be invisible in a top view.

Moreover, if the light sources 102 are small enough, the light sources 102 may alternatively be arranged at gaps between two adjacent rows or columns so that the fingerprint recognition area A' can be formed in the display area, although the positions of the light sources 102 will not be limited thereto.

In the apparatus for recognizing a fingerprint, and the display device according to some embodiments of the disclosure, the supporting element are arranged to support the light sources so that the light rays exiting the respective light sources are incident onto the display panel, and the optically-coupling elements increase the angle at which the light rays emitted from the light sources to the display panel are incident, so that it is easier for the light rays emitted from the light sources to the display panel to be totally reflected in the display panel; and the light rays are totally reflected to the photo-detecting element, and the processing element can determine the touch position of the finger, and the pattern of the fingerprint valleys and ridges of the finger according to the detected signals of the photo-detecting element to thereby recognize the fingerprint precisely. Furthermore, the display device can be simplified in structure, and fabricated at a low cost.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. An apparatus for recognizing a fingerprint, the apparatus comprising: a display panel having a preset transmittance, a plurality of light sources, a supporting element, an optically-coupling element, a photo-detecting element, and a processing element, the optically-coupling element and the photo-detecting element are on optical paths of the light sources wherein:

the display panel comprises: a first surface for displaying, and a second surface opposite to the first surface;

the light sources and the supporting elements are on one side of the second surface of the display panel, and the supporting element are configured to support the light sources so that light rays exiting from the light sources are incident obliquely onto the display panel;

the optically-coupling element and the photo-detecting element are on the second surface, and the photo-detecting element is on a side of the optically-coupling element away from the light sources;

the optically-coupling element is configured to make light rays emitted from the light sources totally reflect in the display panel;

the photo-detecting element is configured to detect exiting light after the light rays exiting from the light sources are reflected by the display panel, and to transmit detected signals to the processing element; and the processing element is configured to determine a pattern of fingerprint according to the detected signals;

wherein the optically-coupling element is a right-angled prism, the right-angled prism has an inclined surface facing the light sources, and has a right-angled surface arranged on the second surface;

wherein the apparatus further comprise a light-absorbing layer; the light-absorbing layer is on a side of the photo-detecting element close to the optically-coupling element, and is on a surface of the photo-detecting element away from the display panel.

2. The apparatus for recognizing a fingerprint according to claim 1, wherein the plurality of light sources are arranged in one dimension in a direction parallel to a surface of the display panel.

3. The apparatus for recognizing a fingerprint according to claim 2, further comprises a plurality of flat convex cylindrical lenses corresponding to the plurality of light sources in a one-to-one manner; and the flat convex cylindrical lenses are on an optical path of their corresponding light source, and axes of the flat convex cylindrical lenses are perpendicular to an arrangement direction of the plurality of light sources.

4. The apparatus for recognizing a fingerprint according to claim 3, wherein a convex surface of the flat convex cylindrical lenses is an aspheric surface.

5. The apparatus for recognizing a fingerprint according to claim 1, wherein the light rays exiting from the light sources are infrared light.

6. The apparatus for recognizing a fingerprint according to claim 5, further comprises a visible-light cutoff filter film located on a side of the photo-detecting element close to the display panel.

7. The apparatus for recognizing a fingerprint according to claim 1, wherein the supporting element has an inclined surface at an angle ranging from 40° to 50° from the second surface; and the light sources are fixed on the inclined surface, and face the display panel.

8. A display device, comprising the apparatus for recognizing a fingerprint according to claim 1.

9. The display device according to claim 8, further comprises a display panel for displaying an image; and the display panel for displaying an image is reused as the display panel in the apparatus for recognizing a fingerprint.

10. The display device according to claim 9, wherein the plurality of light sources in the apparatus for recognizing a fingerprint are arranged at an edge of the display panel.

11. The display device according to claim 8, wherein the plurality of light sources are arranged in one dimension in a direction parallel to a surface of the display panel.

12. The display device according to claim 11, wherein the apparatus for recognizing a fingerprint further comprises a plurality of flat convex cylindrical lenses corresponding to the plurality of light sources in a one-to-one manner; and
the flat convex cylindrical lenses are on an optical path of their corresponding light source, and axes of the flat convex cylindrical lenses are perpendicular to an arrangement direction of the plurality of light sources.

13. The display device according to claim 12, wherein a convex surface of the flat convex cylindrical lenses is an aspheric surface.

14. The display device according to claim 8, wherein the light rays exiting from the light sources are infrared light.

15. The display device according to claim 14, wherein the apparatus for recognizing a fingerprint further comprises a visible-light cutoff filter film located on a side of the photo-detecting element close to the display panel.

16. The display according to claim 8, wherein the supporting element has an inclined surface at an angle ranging from 40° to 50° from the second surface; and
the light sources are fixed on the inclined surface, and face the display panel.

* * * * *